United States Patent Office 3,180,885
Patented Apr. 27, 1965

3,180,885
PROCESS FOR THE PRODUCTION OF α-CYAN-β-ALKYL-β-PHENYLACRYLIC ACID ESTERS
Joachim Nentwig, Krefeld-Bockum, and Wilhelm Krey, Krefeld-Uerdingen, Germany, assignors to Farbenfabriken Bayer Aktiengesellschaft, Leverkusen, Germany, a corporation of Germany
No Drawing. Filed June 28, 1960, Ser. No. 39,204
Claims priority, application Germany, July 4, 1959, F 28,847
5 Claims. (Cl. 260—465)

The present invention is concerned with a technically useful process for the production of esters of α-cyano-β-alkyl-β-phenylacrylic acids (which can also be referred to generically as 1-phenylalkylidene cyanoacetate esters) which belong to an important group of ultraviolet absorption agents.

It is known that oxo compounds react with compounds that have an active methylene group in the presence of catalytic amounts of basic materials with the splitting off of water. Depending upon the reactivity of each of the individual compounds, this reaction proceeds very easily, for example, with aldehydes on the one hand, and, for example, malonic dinitrile on the other hand. However, in the case of ketones, it is generally necessary to employ elevated temperatures for long periods of time particularly if, for example, the less reactive cyanoacetic acid esters are used as methylene compounds. However, the longer reaction times and the elevated temperatures favor not only the aforementioned condensation but also side reactions which thus reduce the yields.

A particularly disturbing side reaction occurs in the case of the condensation of ketones with active methylene compounds especially when catalysts such as salts of ammonia or of primary amines with organic carboxylic acids are used. On the one hand, these amine salts catalyze the condensation between the ketone and the active methylene compounds, but, on the other hand, these compounds are themselves not stable under the reaction conditions and can, for their part, react together with the corresponding possibly N-substituted carboxylic acid amines with the splitting off of water. They thereby become ineffective as catalysts and also contaminate the reaction product. To overcome this undesirable feature, for example, addition of ammonium acetate during the reaction at intervals in small portions has been suggested. It has been stated that a yield of 71 percent of the theory of the ethyl ester of α-cyano-β-methyl-β-phenylacrylic acid is obtained by the reaction of one mol of acetophenone with 2 mols of cyanoacetic acid methyl ester in benzene solution in the presence of 1.6 mols of acetic acid by boiling under reflux for 46 hours with the portionwise addition of 0.75 to 1.2 mols of ammonium acetate. In the case of other more reactive phenylalkyl ketones, however, it should not be necessary to use such a large excess of the cyanoacetic ester. However, even these ketones only condense in good yields with the cyanoacetic ester when a 20 mol percent excess of the cyanoacetic ester is used and when large amounts of ammonium acetate (for example, 1 mol of ketone to 0.25–0.8 mol of catalyst) are added in small portions during the reaction period, which is usually very long and may amount to 52 hours. For the technical production of esters of α-cyano-β-alkyl-β-phenylacrylic acids this process is not suitable. The reaction times are long, the portionwise addition of the catalyst is laborious, and the reaction product is contaminated by large amounts of by-products.

A further side reaction in the case of the production of condensation products from aromatic and aliphatic getones with cyanoacetic acid esters involves the reaction of the carboxylic ester radical (—COOR) with the amine used as catalyst with the formation of an aminocarbonyl radical (—CONH$_2$). This side reaction can take place not only on the starting product but also on the end product obtained by the splitting off of water. It can be shown that substantial amounts of alcohol from the cyanoacetic acid ester are present in the reaction water split off when the reactions are carried out in the manner described.

It is also known that, instead of ketones, the corresponding imines (Schiff bases) can be reacted with methylene compounds with the splitting off of ammonia, to a certain extent even with a better result. Thus, for example, the production of the ethyl ester of α-cyano-β,β-diphenylacrylic acid by the reaction of the Schiff base of benzophenone with ethyl cyanoacetate has been described. However, this reaction cannot be applied to the corresponding acetophenone Schiff base since this imine tends towards self-condensation to an even stronger degree than acetophenone. If, instead of using the Schiff base of acetophenone, a Schiff base of an N-substituted acetophenone is used as starting material, the yield of α-cyano-β-methyl-β-phenylacrylic acid ester scarcely amounts to more than about 50 percent. The remainder is a resin.

We have now found that esters of α-cyano-β-alkyl-β-phenylacrylic acids of the general formula (I) 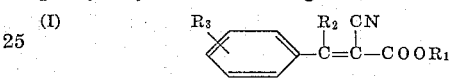

wherein R$_1$ and R$_2$ are aliphatic, cycloaliphatic or araliphatic radicals and R$_3$ is an aliphatic substituent with up to 4 carbon atoms, a cycloaliphatic substituent, an alkoxy radical with up to 3 carbon atoms, a phenoxy radical or a halogen, such as chlorine and bromine, or a nitro group, can be obtained in a technically advantageous manner with very good yields and having particularly high purity when preferably substantially equivalent amounts of N-alkyl-substituted alkylphenyl Schiff bases having the general formula (II) 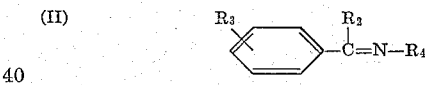

wherein R$_2$ and R$_3$ have the same significance as in Formula I and R$_4$ is an aliphatic radical with up to 6 carbon atoms, a cycloaliphatic radical, the β-hydroxy ethyl or the benzyl group, and cyanoacetic acid esters of the general formula (III)             NC—CH$_2$—COOR$_1$ wherein R$_1$ has the same significance as in Formula I are reacted in the presence of at least stoichiometric amounts of an acid and optionally of organic solvents.

More particularly, in the foregoing Formulae I–III, R$_1$ and R$_2$ may be, for instance, methyl, ethyl, propyl, isopropyl, butyl, isobutyl, pentyl, isopentyl, hexyl, isohexyl, heptyl, isoheptyl, octyl, isooctyl, nonyl, decyl, dodecyl, stearyl, trichloroethyl and so on, alkoxyalkyl radicals such as result from the reaction of a monohydric alcohol, such as methanol, ethanol, propanol, isopropanol, butanol, isobutanol, and so on, or cyclohexanol, with ethylene oxide and/or propylene oxide, as well as the cyclopentyl, cyclohexyl, methylcyclohexyl, ethylcyclohexyl and so on, benzyl, phenylethyl, phenylpropyl and so on, β-methoxyethyl, β-ethoxyethyl, β-propoxyethyl, β-butoxyethyl, β-phenoxyethyl, β-chlorophenoxyethyl and so on, and radicals of the formulae

and

R₃ may be, for instance, methyl, ethyl, propyl, isopropyl, butyl, isobutyl, cyclopentyl, cyclohexyl, the methoxy, ethoxy, propoxy or phenoxy group, chlorine, bromine or the nitro group, and R₄ may be, for instance, methyl, ethyl, propyl, isopropyl, butyl, isobutyl, pentyl, isopentyl, hexyl, isohexyl, cyclopentyl, cyclohexyl, β-hydroxyethyl, and benzyl.

As to the N-substituted alkylphenyl Schiff bases, it is not necessary to isolate the same in pure form. On the contrary, the products can be used as produced, for example, in benzene solution.

As acids there may be used, for example, mineral acids, such as hydrogen chloride (hydrochloric), sulphuric acid and phosphoric acid, but preferably carboxylic acids, such as formic acid, acetic acid and propionic acid.

Finally, as solvents which may possibly also be used there may be mentioned, for example, benzene, toluene, xylene, chlorobenzene, cyclohexane, benzine fractions, methylene chloride, chloroform, carbon tetrachloride, methanol and ethanol.

As a rule, the reaction even proceeds at room temperatures. In some cases, it can be expedient to work with slightly elevated temperatures, for example, up to about 60° C.

The reaction periods are usually very short and, according to the amount of the material to be reacted, generally lie between a few minutes and a few hours. These reaction conditions are so favorable that side reactions which occur in the known processes are not possible.

Many of the reaction products are liquids, although some are solid crystalline compounds. Generally, they are soluble in a number of organic solvents and plasticizers, such as alcohol, acetone, acetic ester (ethyl acetate), methacrylic acid ester (ethyl methacrylate), benzene, styrene, chlorinated hydrocarbons, dimethyl, dibutyl, and dioctyl phthalates, benzyl octyl adipate, dioctyl sebacate, tricresyl phosphate, and castor oil. The products are highly resistant to high temperatures, acids and bases, oxidizing and reducing agents and are not toxic. They absorb ultraviolet rays. Therefore they are very suitable as light stabilizers for plastics, such as cellulose esters, polyvinyl chloride and acetate, polystyrene, polyesters, polyamides, polymethacrylates and the like. Amounts of about 0.01 to about 2.0 percent by weight, based on the weight of the plastics, generally have a sufficient stabilizing effect. For this purpose, the products may be incorporated into the plastics before or during the working up or moulding of the plastics, for instance, by mixing the products or their solutions in a suitable solvent or plasticizers with a solution or melt of the plastics.

The following examples are given for the purpose of illustrating the present invention.

*Example 1*

A mixture of 110 g. (1.1 mols) of cyanoacetic acid methyl ester and 70 g. (1.16 mols) of acetic acid are placed in a 3-necked flask provided with stirrer, thermometer and reflux condenser. A mixture of 215 g. (1 mol) of the Schiff base from propiophenone and cyclohexylamine and 150 g. of benzene are added dropwise during the course of 30 minutes, whereby the temperature increases to 58° C. After the dropwise addition, stirring is continued for two hours at 55–60° C. The reaction product is thoroughly washed with water and 5 percent aqueous hydrochloric acid, the organic layer is dried and the residue, after removal of the benzene, is fractionated in a vacuum. A first running of 9 g. is obtained and a main fraction (B.P. 140–148° C./0.7 mm. Hg) of 185 g. which consists of the desired α-cyano-β-ethyl-β-phenyl-acrylic acid methyl ester. The residue amounts to 6 g. The yield amounts to 86 percent of the theoretical.

*Example 2*

450 g. (3 mols) of p-methoxy-acetophenone, 351 g. of 94 percent cyclohexylamine (3.3 mols), 600 g. of benzene and 10 g. of acetic acid as catalyst are boiled for 6 hours in a flask provided with a Dean and Stark constant water separator. After this time, 58 cm.³ of water have distilled off. After cooling, there is added dropwise to the thus obtained crude solution of the Schiff base of p-methoxy-acetophenone and cyclohexylamine, a mixture of 330 g. (3.3 mols) of cyanoacetic acid methyl ester and 220 g. (3.68 mols) of acetic acid. The temperature increases from 25–60° C. The speed of the dropwise addition is so chosen that the temperature of 60° C. is not exceeded.

The introduction is finished after 30 minutes and the reaction mixture stirred for a further hour at 55–60° C. The reaction product is washed twice with water and twice with an approximately 5 percent aqueous hydrochloric acid, dried, and, after removal of the benzene, is fractionated in a vacuum.

A first running of 110 g. is obtained containing 51 g. of p-methoxy-acetophenone which can be used again. As main fraction there are obtained 600 g. of α-cyano-β-methyl-β-(p-methoxyphenyl)-acrylic acid methyl ester (B.P. about 170–190° C./1 mm. Hg). The residue amounts to 11 g. The yield amounts to 97.5 percent of the theoretical and the conversion to 86.5 percent.

*Example 3*

115 g. (0.5 mol) of the Schiff base from p-methoxy-acetophenone and cyclohexylamine is placed in a small laboratory kneader and gradually mixed with a mixture of 55 g. (0.55 mol) of cyanoacetic acid methyl ester and 35 g. (0.57 mol) of acetic acid, with kneading. The addition of the mixture of cyanoacetic acid methyl ester and acetic acid is finished within 20 minutes. The reaction mixture is kneaded for such a period of time that the mixture has become almost solid (about half an hour). The product is then washed in the kneader once with water and once with 200 cm.³ of dilute hydrochloric acid, filtered and dried at 50° C. in a vacuum. The yield of α-cyano-β-methyl-β-(p-methoxyphenyl)-acrylic acid methyl esters amounts to 105 g. (92 percent of the theoretical.) Its melting point is 86–87° C. The product can further be purified by distillation in a vacuum or by recrystallization from methanol but the crude product, as shown by the melting point, is already sufficiently pure for most applications.

*Example 4*

2079 g. (9 mols) of the Schiff base from p-methoxy-acetophenone and cyclohexylamine are dissolved in 2000 cm.³ of benzene. Whilst stirring, a mixture of 990 g. (10 mols) of cyanoacetic acid methyl ester and 600 g. (10 mols) of acetic acid are added dropwise. The temperature increases from 20 to 60° C. At the end of the introduction of the cyanoacetic acid methyl ester-acetic acid mixture, stirring is continued for one hour at 55–60° C. The reaction mixture is washed three times with 3 percent aqueous hydrochloric acid and once with water and the benzene layer dried. After removal of the solvent, the residue is fractionally distilled. A first running of 102 g. is obtained, of which 64 g. is p-methoxy-acetophenone which can be reused, and 1851 g. boiling at about 170–190° C./1 mm. Hg as the main fraction, which is the desired α-cyano-β-methyl-β-(p-methoxyphenyl)-acrylic acid methyl ester, and 78 g. of residue. The yield, calculated on the p-methoxy-acetophenone, amounts to 93.5 percent of the theoretical and the conversion to 89.2 percent of the theoretical.

By the use of the Schiff base from p-methoxy-acetophenone and isobutylamine and using the same procedure, the yield of the methyl ester of α-cyano-β-methyl-β-(p-methoxyphenyl)acrylic acid amounts to 87 percent of the theoretical.

Example 5

94 g. (0.43 mol) of the Schiff base from acetophenone and cyclohexylamine is dissolved in 250 g. of benzene in a three-necked flask provided with a stirrer, thermometer and reflux condenser. A mixture of 55 g. (0.55 mol) of cyanoacetic acid methyl ester and 40 g. (0.67 mol) of acetic acid is added dropwise within twenty minutes, whereby the temperature rises to 55° C.

The reaction mixture is stirred for a further two hours at 55–60° C. After thorough washing of the reaction mixture with 0.5 percent hydrochloric acid and water it is distilled. A first running of 12 g. is obtained which contains 6 g. of acetophenone, and a main fraction having a boiling range of 150–165° C./9 mm. Hg. Yield is 78 g. of the methyl ester of α-cyano-β-methyl-β-phenyl-acrylic acid (95.5 percent of the theoretical). The product is a yellowish liquid. The distillation residue amounts to 2 g.

Example 6

116 g. (0.5 mol) of the Schiff base from p-methoxy-acetophenone and cyclohexylamine, 50 g. (0.5 mol) of cyanoacetic methyl ester and 400 g. of benzene are placed in a three-necked flask provided with a stirrer, thermometer, gas introduction tube, reflux condenser and gas exit tube. By the introduction of a weak current of hydrogen chloride, a heating of the reaction mixture sets in. At the same time, cyclohexylamine hydrochloride precipitates out. As soon as the evolution of the heat has subsided, the reaction mixture is heated on a water bath at 50° C. and the introduction of the slow current of hydrogen chloride continued for a further six hours. Thereafter, the reaction product is mixed with 150 cm.³ of water, the benzene layer separated off and shaken up twice with 100 cm.³ portions of water. After distilling off the benzene, about 85 g. (73 percent of the theoretical) of α-cyano-β-methyl-β-(p-methoxy-phenyl)-acrylic acid methyl ester remains as a pale yellow solid mass of melting point 59–77° C.

The product is pure enough in this form for most purposes. Nevertheless, it can easily be further purified by distillation or recrystallization, if necessary.

Example 7

116 g. (0.5 mol) of the Schiff base from p-methoxy-acetophenone and cyclohexylamine and 200 g. of benzene are placed in a three-necked flask provided with a stirrer, thermometer and reflux condenser. While stirring, a mixture of 106 g. (0.5 mol) of cyanoacetic acid nonyl ester and 33 g. (0.55 mol) of acetic acid are added dropwise within 15 minutes. The temperature thereby increases from 23–40° C. and cyclohexylamine acetate precipitates out. At the end of the introduction, the reaction mixture is heated for a further half hour on a water bath at 60° C. 200 cm.³ of water are then added, separated and the benzene layer washed with 100 cm.³ of 5 percent hydrochloric acid, dried with anhydrous sodium sulphate and the filtrate freed from benzene at a subatmospheric pressure obtained by means of a water pump. The residue amounts to 169 g. This is worked up by distillation. 161 g. of the nonyl ester of α-cyano-β-methyl - β - (p-methoxyphenyl)-acrylic acid is obtained which corresponds to a yield of 93 percent of the theoretical.

*Analysis.*—$C_{21}H_{29}O_3N$ (molecular weight=343): Calculated: C=73.5%; H=8.45%; O=14.00%. Found: C=73.4%; H=8.60%; O=13.97%.

The product is an almost colorless, viscous liquid; $n_D^{26}$=1.5371.

Example 8

50 g. (0.5 mol) of cyanoacetic acid methyl ester, 200 g. of benzene and 17 g. of orthophosphoric acid (0.173 mol) are placed in a three-necked flask provided with a stirrer, reflux condenser and thermometer. A solution of 116 g. (0.5 mol) of the Schiff base from p-methoxy-acetophenone and cyclohexylamine in 100 g. of benzene is added to the mixture. The mixture is heated for 7 hours at 60° C. The reaction mixture is washed twice with 250 cm.³ of 7 percent aqueous hydrochloric acid and then with 200 cm.³ of water, dried over anhydrous sodium sulphate and freed from benzene. There are obtained 93 g. of the methyl ester of α-cyano-β-methyl-β-(p-methoxyphenyl)-acrylic acid (80 percent of the theoretical). The product is a pale, yellow, crystalline mass of melting point 74–81° C.

In corresponding manner the following products may be prepared.

Products listed in the following tables which have the formula

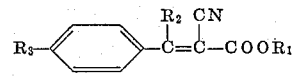

wherein $R_2$ is —$CH_3$, $R_3$ is —$OCH_3$ and $R_1$ is one of the following radicals:

| $R_1$ | Molecular weight | Boiling point, °C./mm. | $n_D^{25}$ | Yield percent of the theory |
|---|---|---|---|---|
| $CH_3CH_2CH_2$— | 259 | 157–175/0.2 | 1.5614 | 83 |
| $CH_3CH_2CH_2CH_2$— | 273 | 166–173/0.2–0.15 | 1.5549 | 89.6 |
| $CH_3CH_2CHCH_3$— | 273 | 178–179/0.2–0.1 | 1.5509 | 87.3 |
| $CH_3CHCH_2$— (CH_3) | 273 | 174–179/0.2 | 1.5541 | 78.8 |
| $C_5H_{11}$— | 287 | 175–179/0.2 | 1.5481 | 87 |
| $CH_3CHCH_2CH_2$— (CH_3) | 287 | 180–188/0.2 | 1.5487 | 87.5 |
| $C_6H_{13}$— | 301 | 173–175/0.15–0.1 | 1.5444 | 83.7 |
| $CH_3CH_2CH_2CHCH_2$— (CH_3) | 301 | 176–178/0.2–0.1 | 1.5448 | 84 |
| (CH_3)_2CHCHCH(CH_3)_2 — | 315 | 175–187/0.15–0.2 | 1.5412 | 75.4 |
| $C_8H_{17}$— | 329 | 206–214/0.2 | 1.5363 | 84.3 |
| $CH_3CH_2CH_2CH_2CHCH_2$— ($C_2H_5$) | 329 | 185–198/0.1 | 1.5368 | 88 |

| $R_1$ | | Molecular weight | Boiling point, °C./mm. | $n_D{}^{52}$ | Yield percent of the theory |
|---|---|---|---|---|---|
| $C_{18}H_{37}-$ | | 469 | [1] 275–295/0.35 | | [2] 9.93 |
| $CH_3OCH_2CH_2-$ | | 275 | 170–175/0.2 | 1.5642 | 73 |
| $CH_3-[-O-CH_2CH_2-]_2-O-CH_2CH_2-$ | | 363 | 220–244/0.2 | 1.5423 | 74 |
| $CH_3-[-O-CH_2CH_2-]_3-O-CH_2CH_2-$ | | 415 | | 1.5302 | [2] 95 |
| $CH_3-[-O-CH_2CH_2-]_4-O-CH_2CH_2-$ | | 451 | | 1.5288 | [2] 92 |
| $C_3H_7OCH_2CH_2-$ | | 303 | 195–205/0.15 | 1.5482 | 82 |
| $C_4H_9OCH_2CH_2-$ | | 317 | 201–210/0.15 | 1.5441 | 88.5 |

[1] Decomposition melting point, 59–61°.
[2] Percent raw product.

and products wherein $R_2$ is $-CH_3$ and $R_1$ and $R_3$ have the following significance:

| $R_1$ | $R_3$ | Molecular weight | Boiling point, °C./mm. | $n_D{}^{25}$ | Yield percent of the theory |
|---|---|---|---|---|---|
| $C_6H_5-CH_2-$ | $CH_3O-$ | 307 | 218–234/0.2 | 1.6017 | 67 |
| 2-methylphenyl ($CH_3$, H on ring) | $CH_3O-$ | 313 | 201–207/0.25 | 1.5584 | 70 |
| $C_6H_5-CH_2-CH_2-$ | $CH_3O-$ | 321 | 233–240/0.1–0.2 | 1.5956 | 75 |
| phenyl (H) | $CH_3O-$ | 299 | 210–212/0.15 | 1.5660 | 80 |
| $CH_3-$ | $C_6H_5-O-$ | 293 | 230–244/0.25 | 1.6064 | 90 |
| $C_6H_5-CH_2-$ | $C_6H_5-O-$ | 369 | 265–273/0.3 | 1.6163 | 73 |
| Isooctyl– | $C_6H_5-O-$ | 391 | 242–246/0.3 | 1.5598 | 82 |
| $\begin{array}{c}CH_2-\\|\phantom{xx}CH_2\\C\diagup\phantom{x}\diagdown O\\|\phantom{xx}CH_2\\C_2H_5\end{array}$ | $CH_3O-$ | 315 | 205–215/0.12 | 1.5643 | 73 |
| $\begin{array}{c}CH_2-CH_2\\|\phantom{xx}|\\CH_2\phantom{x}CH-CH_2-\\\diagdown O\diagup\end{array}$ | $CH_3O-$ | 301 | 198–210/0.12 | 1.5723 | 83 |
| $\begin{array}{c}CH_2-CH_2\\|\phantom{xx}|\\CH_2\phantom{x}CH-CH_2-\\\diagdown O\diagup\end{array}$ | $C_6H_5-O-$ | 363 | 245–248/0.25 | 1.5905 | 76 |
| $\begin{array}{c}CH_2-\\|\phantom{xx}CH_2\\O\diagup\phantom{x}\diagdown O\\|\phantom{xx}CH_2\\C_2H_5\end{array}$ | $C_6H_5-O-$ | 377 | 240–250/0.2 | 1.5821 | 72 |
| $CH_2Cl-CH_2-$ | $CH_3O$ | 279.5 | 195–208/0.05 | 1.5841 | 77 |

We claim:
1. A process for the production of a 1-phenyl-substituted alkylidene cyanoacetate having the formula

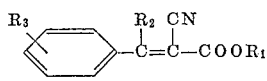

which comprises reacting together at a temperature below approximately 60° C. in substantially equimolecular amounts (a) an ester of cyanoacetic acid having the formula $NC-CH_2-COOR_1$, and (b) a Schiff base having the formula

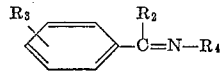

in each of which formulae

R₁ and R₂ are each a radical of the group consisting of alkyl containing up to 18 carbon atoms, lower alkoxy lower alkyl, phenoxy lower alkyl, cyclopentyl, cyclohexyl, methylcyclohexyl, ethylcyclohexyl, benzyl, phenethyl, and phenylpropyl.

R₃ is a radical of the group consisting of aliphatic radicals containing up to 4 carbon atoms, cyclopentyl and cyclohexyl radicals, alkoxy radicals containing up to 3 carbon atoms, and phenoxy, chlorine, bromine and nitro radicals, and R₄ is a radical of the group consisting of alkyl containing up to 6 carbon atoms, cyclopentyl and cyclohexyl, hydroxyethyl and benzyl, in the presence of an acid of the group consisting of hydrochloric, sulfuric, phosphoric, formic, acetic and propionic acids in an amount at least equivalent stoichiometrically to the molecular equivalent of Schiff base.

2. A process as defined in claim 1 in which the reactants are dissolved in a solvent of the group consisting of benzene, toluene, xylene, chlorobenzene, cyclohexane, benzine, methylene chloride, chloroform, carbon tetrachloride, methanol and ethanol.

3. A process for the production of methyl 1-(4-methoxyphenyl)ethylidene cyanoacetate which comprises heating together, at a temperature sufficient to maintain a gentle reflux while continuously separating water evolved during the heating, a solution in benzene of approximately equimolecular proportions of 4-methoxyacetophenone and cyclohexylamine together with a small catalytic quantity of acetic acid, for such a period that a substantial portion of the amine and ketone are converted to a Schiff base, thereafter adding portionwise, to the benzene solution of Schiff base thus prepared, a mixture of an approximately stoichiometrically equivalent amount of methyl cyanoacetate and an approximately stoichiometrically equivalent amount of acetic acid, while maintaining the temperature below approximately 60° C., and subsequently recovering the methyl 1-(4-methoxyphenyl)-ethylidene cyanoacetate thus formed from the resulting mixture.

4. A process for the production of methyl 1-phenylpropylidene cyanoacetate which comprises reacting together a solution in benzene of approximately equimolecular proportions of the Schiff base of propiophenone and cyclohexylamine, methyl cyanoacetate, and acetic acid at a temperature below approximately 60° C., and subsequently recovering the methyl 1-phenylpropylidene cyanoacetate from the resulting mixture.

5. A process for the production of methyl 1-phenylethylidene cyanoacetate which comprises reacting together a solution in benzene of approximately equimolecular proportions of the Schiff base of acetophenone and cyclohexylamine, methyl cyanoacetate, and acetic acid at a temperature below approximately 60° C., and subsequently recovering the methyl 1-phenylethylidene cyanoacetate from the resulting mixture.

References Cited in the file of this patent

UNITED STATES PATENTS 2,623,060    Cragoe _____ Dec. 23, 1952

OTHER REFERENCES

Charles: Academie des Sciences Comptes Rendus, June 9, 1958, Tome 246, pages 3259–3260.

Hauser et al.: J.A.C.S., 62 (1940), pages 2389–2392.

Cope et al.: J.A.C.S., 63 (1941), pages 3452–3456.